United States Patent [19]

Urbani

[11] Patent Number: 4,894,617
[45] Date of Patent: Jan. 16, 1990

[54] DEVICE FOR LOCATING STEEL RODS BURIED IN HIGH-DENSITY REINFORCED CONCRETE

[75] Inventor: Alessio Urbani, Monza, Italy
[73] Assignee: Ansaldo S.p.A., Genoa, Italy
[21] Appl. No.: 185,533
[22] Filed: Apr. 25, 1988
[51] Int. Cl.⁴ .......................... G01V 3/08; G01V 3/10; G01N 27/72; G01R 33/12
[52] U.S. Cl. .................................. 324/329; 324/239; 324/243
[58] Field of Search ............................. 324/326–329, 324/239, 243

[56] References Cited
U.S. PATENT DOCUMENTS
2,680,226  6/1954  Whitehead et al. ................. 324/326
3,675,502  4/1975  Neumaier ............................ 324/241

Primary Examiner—Reinhard J. Eisenzopf
Assistant Examiner—Walter E. Snow
Attorney, Agent, or Firm—Robert E. Burns; Emmanuel J. Lobato

[57] ABSTRACT

The subject-matter of this invention is a device for locating rods buried in high-density reinforced concrete. The device envisages an inductor coil (10) which generates a magnetic field, and at least one detector coil (1) able to detect the variations in the magnetic field induced by the presence of steel rods. The device is associated with marking equipment (4), which may be controlled either manually or automatically, depending on the strength of the signal emitted by the detector coil(s).

2 Claims, 3 Drawing Sheets

DEVICE FOR LOCATING STEEL RODS BURIED IN HIGH-DENSITY REINFORCED CONCRETE

BACKGROUND OF THE INVENTION

In building civil works aimed at accommodating heavy industrial plants such as those for the production of nuclear or conventional power, once the works have been erected it is necessary to make thousands of holes in order to apply brackets or supports to hold equipment or auxiliary pipelines. Since the reinforcement rods are very closely packed and have large diameters, there is a high probability of encountering one whenever making a hole, in which case the hole cannot be continued. The use of a device capable of defining with a good degree of accuracy the position of a grid of smaller rods using simple equipment makes it possible to achieve a considerable reduction in the cost of making holes in reinforced concrete.

This invention concerns precisely a device of this type.

BRIEF SUMMARY OF THE INVENTION

The device consists of two parts:
a portable box containing the batteries and the oscillator-power supply
a disk-shaped or blade-shaped sensor which the operator runs over the wall in a direction approximately at right angles to the direction in which the rods are presumed to be aligned.

The operator is warned by suitable indicators of the proximity of the iron.

DETAILED DESCRIPTION OF THE PREFERRED EMBODIMENT

Figure 1:
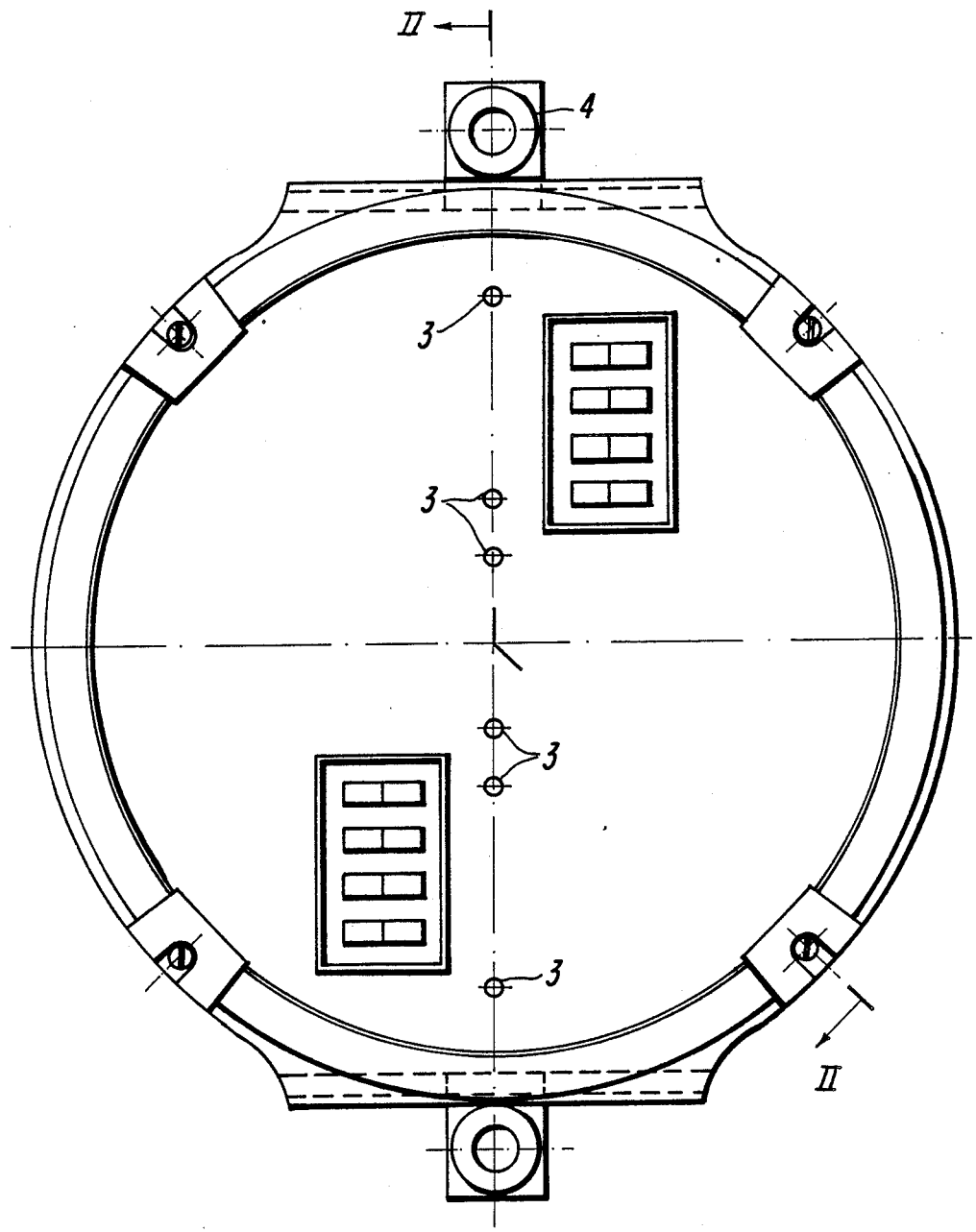
FIG. 1 is the front view of a preferred embodiment of the device according to the invention.
Figure 2:
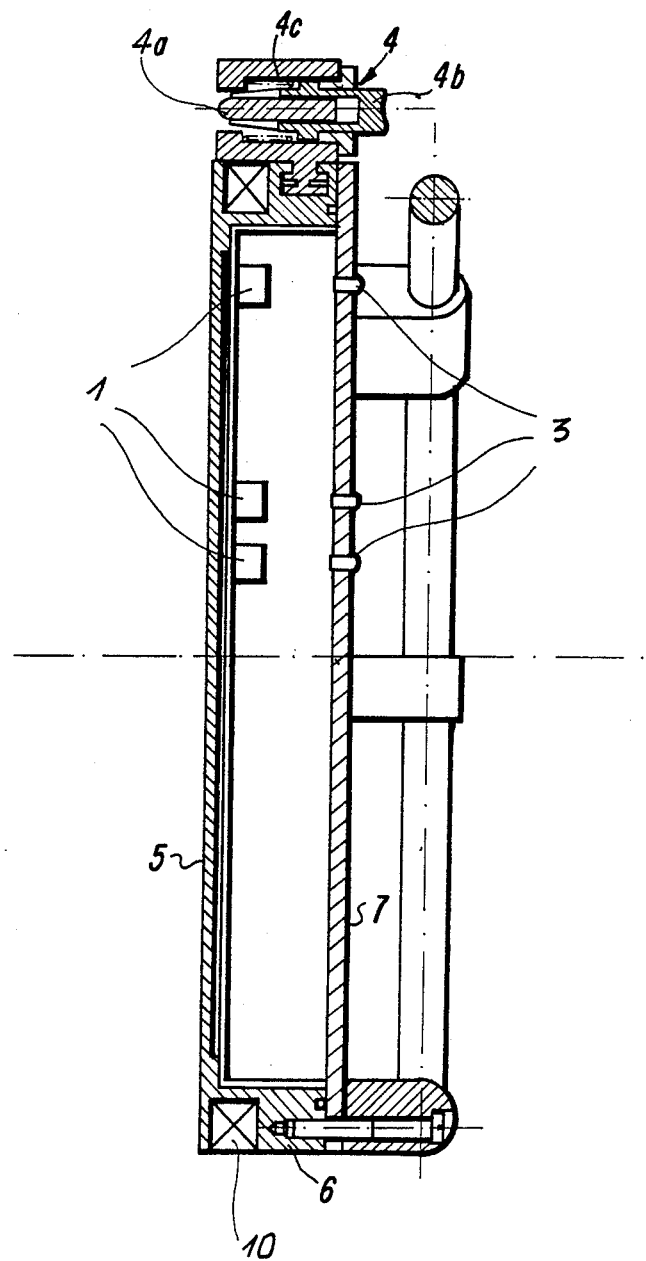
FIG. 2 is a cross-section of FIG. 1 on II—II.

A schematic diagram of the sensor may be seen in FIGS. 1 and 2. It consists basically of a disk-shaped support 5 having and upstanding peripheral rim 6. A cover 7 is seated on the rim. The support is surrounded by a circular inductor coil 10 fed by a low frequency alternating current which generates an alternating magnetic feild in the surrounding area.

A plurality of small detector coils 1 are mounted on the support 5 inside the inductor coil 10 and a like plurality of signalling lamps 3 are disposed on the cover 7 in alignment with respective detector coils 1. As seen in FIG. 1, the detector coils 1 and corresponding lamps 3 are spaced apart from one another on a diameter of the inductor coils 10, with coils located on opposite sides of the center of the inductor coil. In the embodiment illustrated in the drawings, there are three detector coils on one side of the center of the inductor coil and three on the other side of the center.

When the small detector coils 1—the position of which is indicated by signalling lamps 3—are introduced into the area in which an alternating magnetic field is generated by the inductor coil, alternating voltages having a constant effective value are induced in same.

The presence of ferromagnetic materials distorts the field, concentrating the flux in correspondence with the material itself; if one of the detector coils 1 is near to the iron, therefore, an increase of the induced voltage will be noted, detectable by a suitable amplifier, which will reach the peak when the coil 1 is in a position corresponding exactly to the iron.

Figure 3:
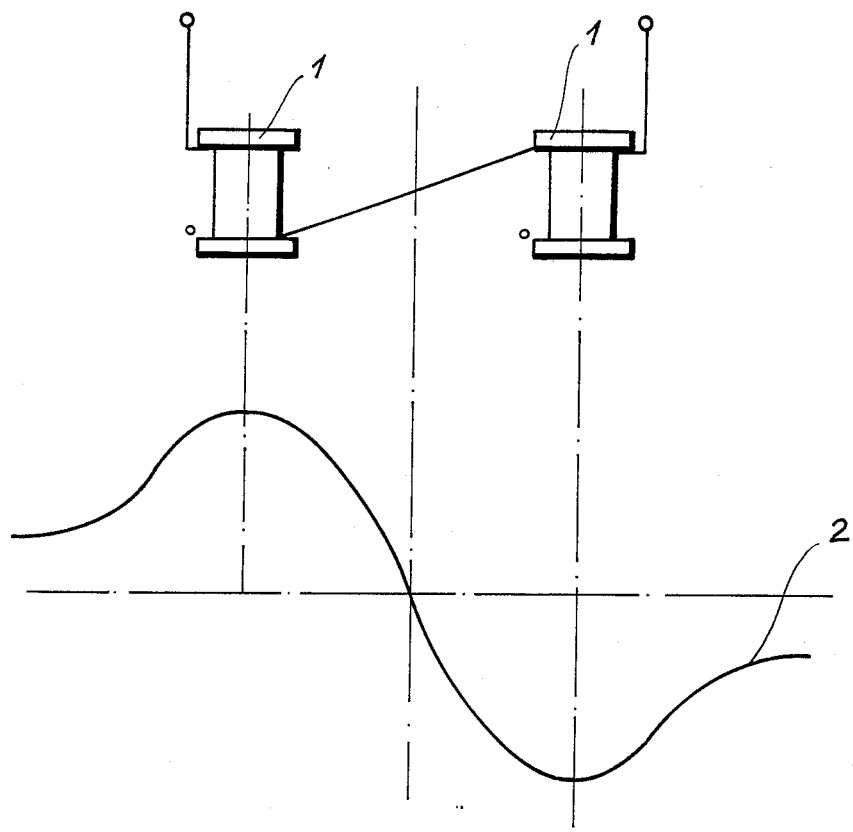
FIG. 3 shows the analog response of a pair of coupled coils.

In order to increase the sensitivity and locating capacity of the sensor it is advisable to connect a pair of coils with opposite phases. Depending on the position of the rod in relation to the coils 1, the signal obtained may be recorded by the control unit. This signal will develop in accordance with the curve shown in FIG. 3, and will give rise to a relative maximum or minimum when the rod corresponds to one of the two coils.

In this case the operator can mark the wall by means of a special marking device 4 fitted to the sensor. The marking device is shown in FIG. 2 as comprising a marking element 4a carried by a plunger 4b which can be pushed inwardly against the force of a spring 4c.

The system described above offers a number of advantages, as listed herebelow:
  Accuracy in locating the rods even in reinforced concrete with very closely packed rods.
  Small dimensions and manageability.
  Easy to use by a single operator.
  Possibility of recording the data measured.
  Repeatability of measurements.
  Independence from external variables (temperature, humidity, type of cement, etc.)

What I claim is:

1. A device for locating steel rods buried in a high-density reinforced concrete structure comprising:
   a disk-shaped support having an upstanding peripheral rim, said support being movable over an area of a surface of said high-density reinforced concrete structure transversely to the direction of steel rods in said structure,
   a disk-shaped cover seated on said upstanding rim,
   an inductor coil fed with low frequency alternating current extending around the periphery of said support and generating a magnetic field in the surrounding area,
   a plurality of small detector coils which detect an increase of the magnetic field generated by said inductor coil due to the presence of ferromagnetic material when passing over a steel rod buried in said structure, said detector coils being dispersed on said support within said inductor coil and being spaced apart from one another on a diameter of said inductor coil and located on opposite sides of the center of said inductor coil, and
   a like plurality of signalling lamps on said cover in alignment with respective detector coils, thereby indicating the location of respective detector coils.

2. A device according to claim 1, further comprising a marking device disposed on said rim in alignment with said diameter of said inductor coil on which said detector coils are disposed.

* * * * *